(12) United States Patent  (10) Patent No.: US 9,162,700 B2
Tinnin  (45) Date of Patent: Oct. 20, 2015

(54) MULTI PURPOSE FRICTION PLATE ASSEMBLY

(71) Applicant: Steering Solutions IP Holding Corporation, Saginaw, MI (US)

(72) Inventor: Melvin L. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 14/204,267

(22) Filed: Mar. 11, 2014

(65) Prior Publication Data

US 2014/0251060 A1  Sep. 11, 2014

Related U.S. Application Data

(60) Provisional application No. 61/776,397, filed on Mar. 11, 2013.

(51) Int. Cl.
*B62D 1/184* (2006.01)

(52) U.S. Cl.
CPC ........... *B62D 1/184* (2013.01); *Y10T 29/49963* (2015.01); *Y10T 403/32254* (2015.01)

(58) Field of Classification Search
USPC .............. 74/492, 493, 495; 180/444; 280/775, 280/777
See application file for complete search history.

(56) References Cited

U.S. PATENT DOCUMENTS

| | | | | |
|---|---|---|---|---|
| 5,338,064 A * | 8/1994 | Sadakata et al. | | 280/775 |
| 5,503,431 A * | 4/1996 | Yamamoto | | 280/777 |
| 5,722,299 A * | 3/1998 | Yamamoto et al. | | 74/493 |
| 5,787,759 A * | 8/1998 | Olgren | | 74/493 |
| 6,139,057 A * | 10/2000 | Olgren et al. | | 280/775 |
| 6,419,269 B1* | 7/2002 | Manwaring et al. | | 280/775 |
| 6,616,185 B2* | 9/2003 | Manwaring et al. | | 280/775 |
| 7,677,133 B2* | 3/2010 | Matsui et al. | | 74/493 |
| 7,685,903 B2* | 3/2010 | Streng et al. | | 74/493 |
| 7,752,940 B2* | 7/2010 | Lutz | | 74/493 |
| 7,827,880 B2* | 11/2010 | Riefe et al. | | 74/493 |
| 2003/0057694 A1* | 3/2003 | Manwaring et al. | | 280/775 |
| 2009/0013817 A1* | 1/2009 | Schnitzer et al. | | 74/493 |
| 2009/0218800 A1* | 9/2009 | Rouleau et al. | | 280/775 |
| 2009/0272219 A1* | 11/2009 | Okada et al. | | 74/493 |
| 2010/0219624 A1* | 9/2010 | Matsuno | | 280/779 |
| 2010/0243368 A1* | 9/2010 | Suzuki | | 180/444 |
| 2011/0210537 A1* | 9/2011 | Uesaka | | 280/775 |
| 2012/0304796 A1 | 12/2012 | Tinnin et al. | | |
| 2012/0304797 A1 | 12/2012 | Tinnin et al. | | |

* cited by examiner

*Primary Examiner* — Keith Frisby
*Assistant Examiner* — Darlene P Condra
(74) *Attorney, Agent, or Firm* — Cantor Colburn LLP

(57) ABSTRACT

In accordance with an exemplary embodiment of the invention, a friction plate assembly is provided. The assembly includes a locking member having a toothed portion, a bolt extending through the locking member, and a friction plate configured for frictional engagement with the locking member. The friction plate receives the bolt therethrough and includes at least one biasing member configured to bias the bolt and the locking member in a first direction. When a predetermined force acts on the at least one biasing member, the friction plate is configured to force the locking member toothed portion into engagement with an object to facilitate preventing movement of the bolt in a second direction.

20 Claims, 3 Drawing Sheets

MULTI PURPOSE FRICTION PLATE ASSEMBLY

CROSS-REFERENCES TO RELATED APPLICATIONS

This patent application claims priority to U.S. Provisional Patent Application Ser. No. 61/776,397, filed Mar. 11, 2013, which is incorporated herein by reference in its entirety.

FIELD OF THE INVENTION

The present invention relates generally to steering columns and, more specifically to locking adjustment mechanisms for steering columns.

BACKGROUND OF THE INVENTION

Conventional adjustment assemblies, for example, adjustment assemblies which allow for adjustment of a steering column in a vehicle, include a lever that is rotatable between two positions to lock and unlock the adjustment assembly. For example, with a lever in a first position, the adjustment assembly may lock a steering column in a desired position, thereby fixing the steering column against adjustment. The lever may be rotated to a second position, thereby unlocking the adjustment assembly and allowing the steering column to be adjusted.

Some known steering column assemblies may include one or more friction locks arranged along the raking and telescoping ranges of motion of the steering column. Such locks may facilitate fixing a position of the steering column assembly or enabling adjustments in both the telescoping and raking directions. For example, a steering column lock may include friction plates to create additional friction surfaces between friction plate sets to achieve higher holding loads. As more plates are added to the set, more friction is achieved. However, some known locks may not provide a frictional force sufficient to prevent movement of the steering column assembly during high load events such as a crash event.

Accordingly, it is desirable to provide a system and method for selectively fixing and adjusting a position of a steering column with improved resistance to high loads.

SUMMARY OF THE INVENTION

In accordance with an exemplary embodiment of the invention, a friction plate assembly is provided. The assembly includes a locking member having a toothed portion, a bolt extending through the locking member, and a friction plate configured for frictional engagement with the locking member. The friction plate receives the bolt therethrough and includes at least one biasing member configured to bias the bolt and the locking member in a first direction. When a predetermined force acts on the at least one biasing member, the friction plate is configured to force the locking member toothed portion into engagement with a clamp block to facilitate preventing movement of the bolt in a second direction.

In accordance with another exemplary embodiment of the invention, an adjustable steering column assembly for a vehicle is provided. The assembly includes a steering column arranged for positional adjustment in a first direction, a mounting bracket fixed to the vehicle and disposed about the steering column, and a steering column clamp block coupled to the mounting bracket, the steering column clamp block having a first edge and a second edge. The assembly further includes a locking member having an engagement portion, the locking member disposed within the steering column clamp block such that the engagement portion is in proximity to the second edge for selective engagement therewith, a bolt extending through the steering column clamp block and the locking member, and a friction plate disposed within the steering column clamp block and configured for frictional engagement with the locking member. The friction plate receives the bolt therethrough and includes at least one biasing member engaging the first edge. The at least one biasing member is configured to bias the bolt and the locking member in a second direction where the engagement portion does not engage the second edge. When a predetermined force acts on the at least one biasing member, the friction plate forces the locking member engagement portion into engagement with the second edge.

In accordance with yet another exemplary embodiment of the invention, a method of assembling an adjustable steering column for a vehicle is provided. The method includes providing a steering column arranged for positional adjustment in a first direction, fixing a mounting bracket to the vehicle such that the mounting bracket is disposed about the steering column, and coupling a steering column clamp block to the mounting bracket, the steering column clamp block having a first edge and a second edge. The method further includes disposing a locking member having an engagement portion within the steering column clamp block such that the engagement portion is in proximity to the second edge for selective engagement therewith, inserting a bolt through the steering column clamp block and the locking member, and disposing a friction plate within the steering column clamp block. The friction plate receives the bolt therethrough, and the friction plate is configured for frictional engagement with the locking member. The friction plate includes at least one biasing member engaging the first edge, and the at least one biasing member is configured to bias the bolt and the locking member in a second direction where the engagement portion does not engage the second edge.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
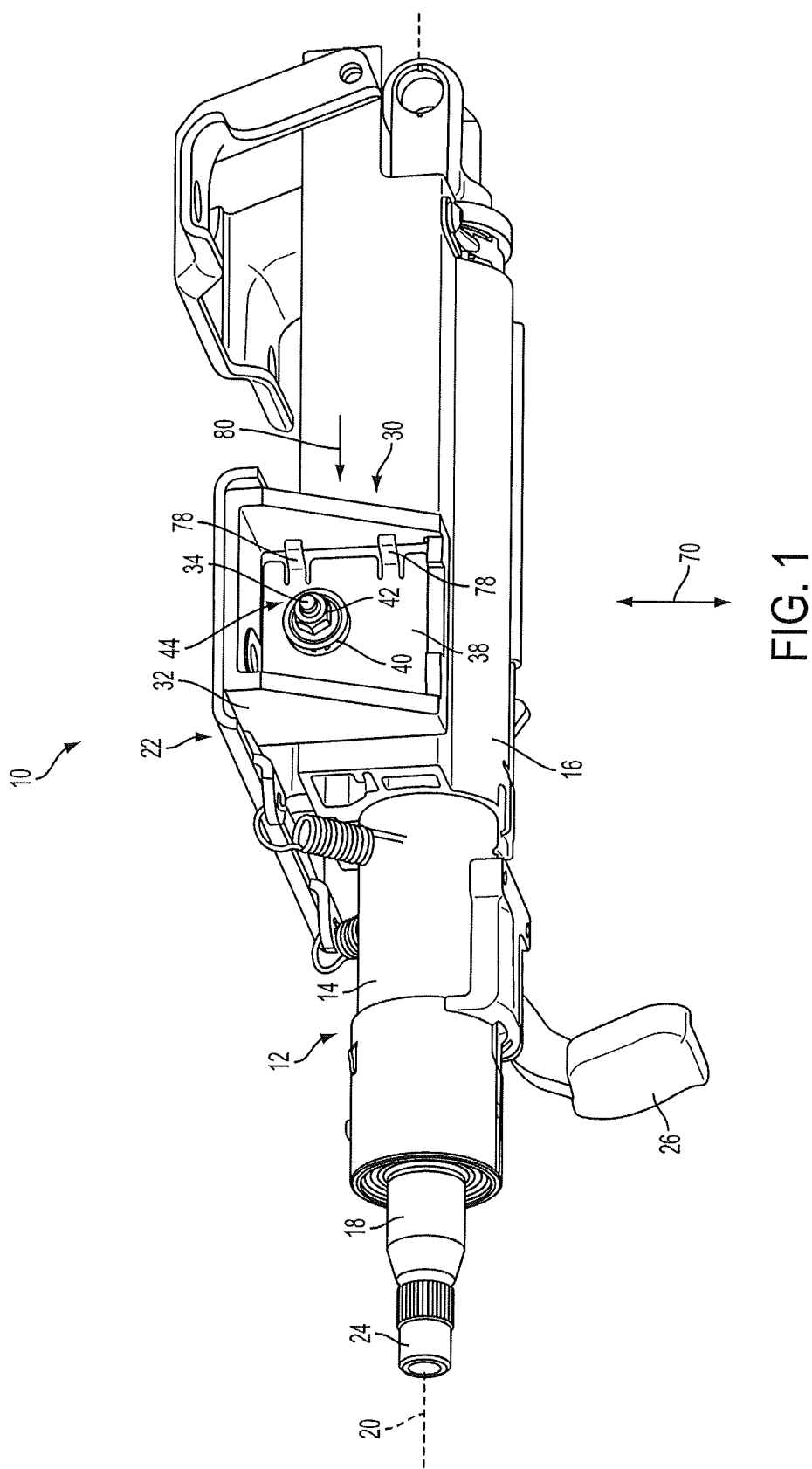
FIG. 1 is a perspective view of a steering column assembly having a friction plate assembly according to an exemplary embodiment of the present invention.

Referring now to the Figures, where the invention will be described with reference to specific embodiments, without limiting same, FIG. 1 illustrates an exemplary adjustable steering column assembly 10 that includes a steering column 12. In the exemplary embodiment, steering column 12 generally includes an upper jacket 14 and a lower jacket 16 housing a steering column shaft 18 disposed along a longitudinal axis 20. A mounting bracket 22 is coupled to upper jacket 14 and to a host structure of a vehicle (not shown). Upper jacket 14 is arranged coaxially with lower jacket 16 and longitudinal axis 20 and is configured to translate along axis 20 relative to lower jacket 16, thereby facilitating telescoping motion of steering column assembly 10. Steering column 12 includes a steering wheel end 24 configured to receive a vehicle steering wheel (not shown).

Figure 2:
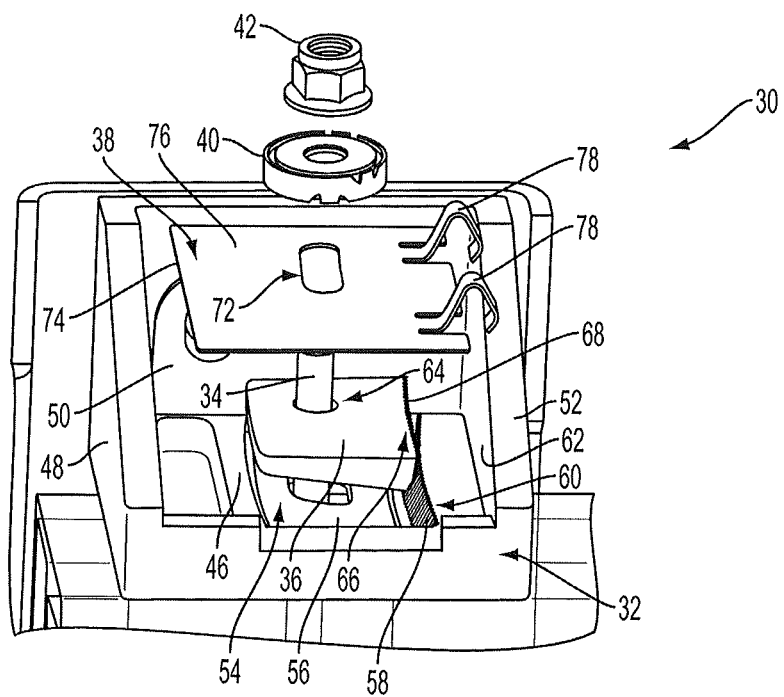
FIG. 2 is an exploded view of the exemplary friction plate assembly shown in FIG. 1.
Figure 3:
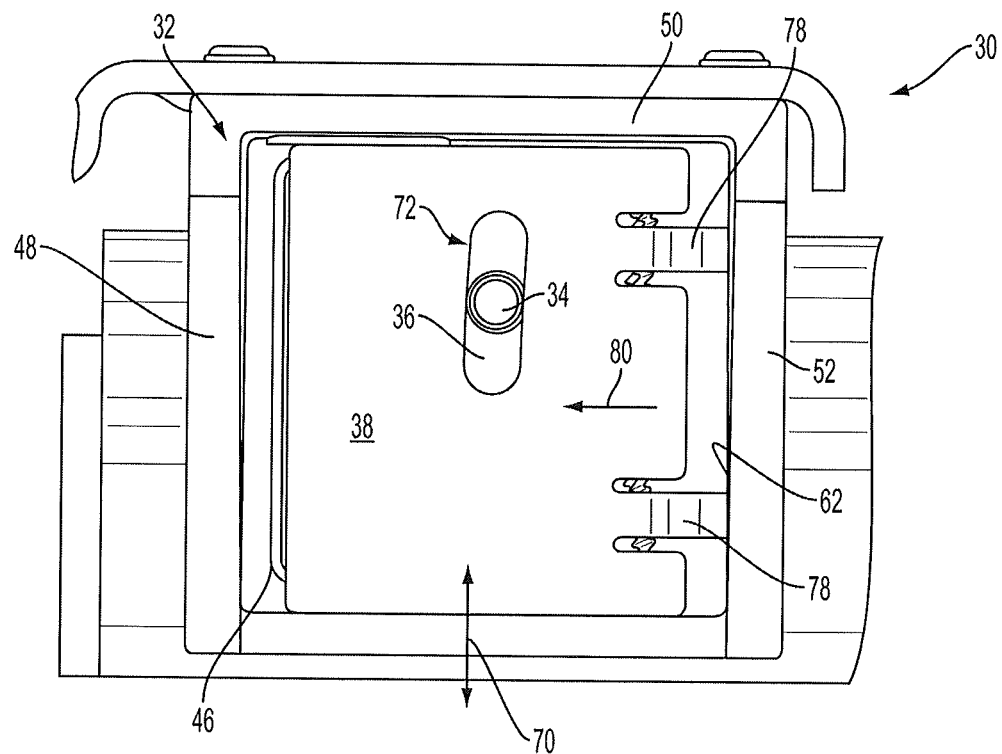
FIG. 3 is a side view of the exemplary friction plate assembly shown in FIGS. 1 and 2 and in a first position.
Figure 4:
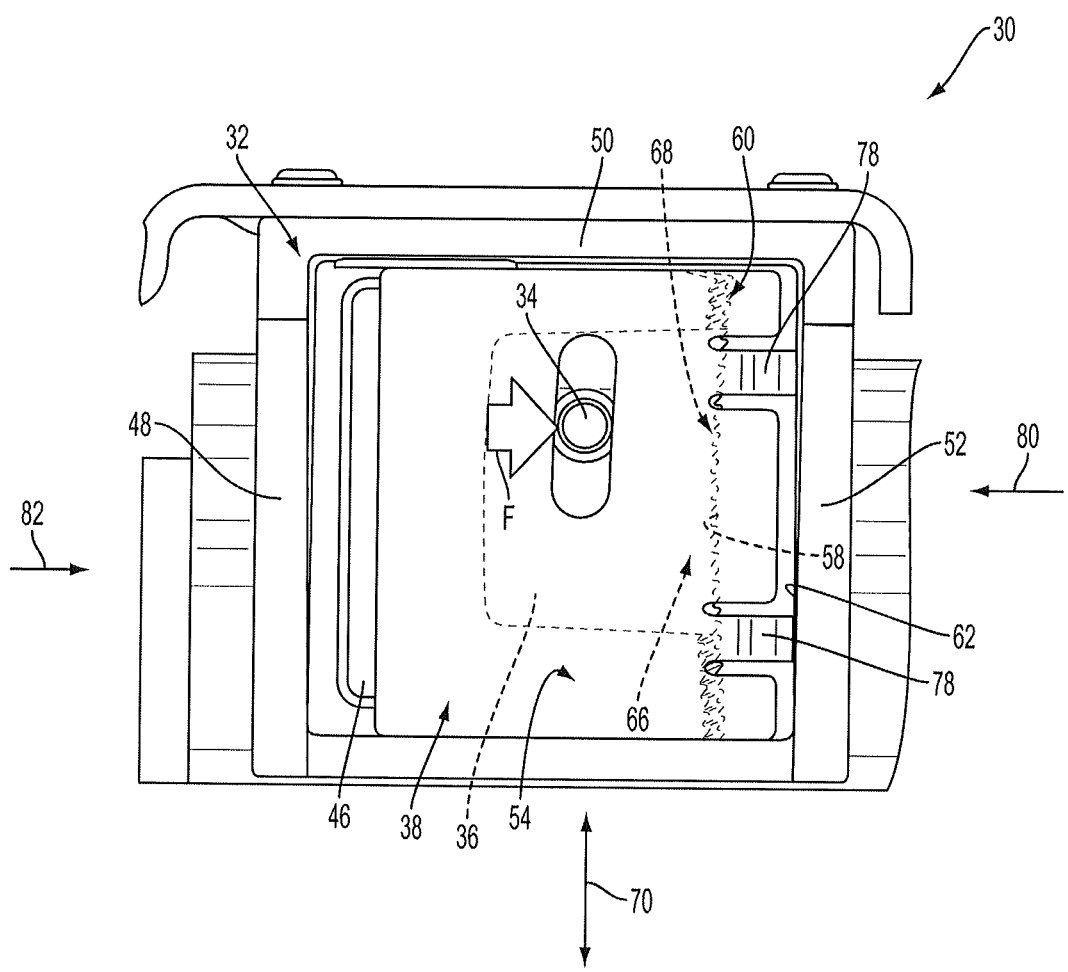
FIG. 4 is a side view of the exemplary friction plate assembly shown in FIG. 3 and in a second position.

With reference to FIGS. 2-4, adjustable steering column assembly 10 includes an exemplary friction plate assembly 30 configured to selectively permit adjustment of steering column assembly 10 in raking and/or telescoping directions. Friction plate assembly 30 generally includes a steering column clamp block 32, a control bolt 34, a locking member 36, and a friction plate 38. In the exemplary embodiment, clamp block 32 is coupled to mounting bracket 22. Alternatively, clamp block 32 may be integrally formed with mounting bracket 22.

Control bolt 34 is coupled to lower jacket 16 and extends through locking member 36 and friction plate 38. A thrust bearing 40 may be inserted over control bolt 34 and a threaded nut 42 is coupled to a first end 44 of bolt 34 to secure locking member 36, friction plate 38, and thrust bearing 40 to control bolt 34 within clamp block 32. With further reference to FIG. 1, a lever 26 and cam (not shown) are operatively coupled to bolt 34 to facilitate actuation of friction plate assembly 30 for selectively locking steering column 12 in a desired position. In the exemplary embodiment, friction plate assembly 30 is positioned only on the right side of steering column assembly 10. Alternatively, friction plate assembly 30 may be positioned on the left side, or an assembly 30 may be positioned on both sides of steering column assembly 10 so as to meet design considerations associated with a particular implementation. Further, when positioned on both sides of steering column assembly 10, one of the friction plate assemblies 30 may exclude one or more components (e.g., friction plate 38).

In the exemplary embodiment, steering column clamp block 32 includes a base 46 having a first sidewall 48, a second sidewall 50, and a third sidewall 52 extending therefrom. A cavity 54 formed in base 46 is configured to receive locking member 36 and defines a base surface or edge 56 and a first surface or edge 58 of clamp block 32. As illustrated in FIGS. 2 and 4, first edge 58 includes a plurality of teeth 60 and has a generally arcuate shape. Alternatively, first edge 58 may have any suitable shape that enables friction plate assembly 30 to function as described herein. Third sidewall 52 defines a second surface or edge 62 of clamp block 32, and first edge 58 and second edge 62 are operatively associated with locking member 36 and friction plate 38, respectively, as is described herein in more detail.

Locking member 36 includes an aperture 64 configured to receive control bolt 34, and an engagement portion 66 configured to selectively engage clamp block first edge 58. As shown in FIGS. 2 and 4, engagement portion 66 includes a plurality of teeth 68 and has a generally arcuate shape complementary to first edge 58. Alternatively, engagement portion 66 may have any suitable shape that enables friction plate assembly 30 to function as described herein. In the exemplary embodiment, engagement between teeth 60 and teeth 68 facilitates preventing movement of locking member 36 relative to clamp block 32 in a direction indicated by arrows 70 (e.g., in an up/down raking direction).

Friction plate 38 includes an elongated aperture 72 configured to receive control bolt 34, a first surface 74 configured for frictional engagement with locking member 36, and a second surface 76 configured for frictional engagement with thrust bearing 40. Friction plate 38 includes biasing members 78 extending therefrom that are configured for engagement with clamp block second edge 62. In the exemplary embodiment, biasing members 78 are spring fingers stamped from friction plate 38. Alternatively, member 78 may be any suitable biasing element coupled to or formed from friction plate 38 that enables friction plate assembly 30 to function as described herein. Moreover, although friction plate 38 is illustrated with two biasing member 78, plate 38 may have any suitable number of biasing members 78 that enable friction plate assembly 30 to function as described herein.

As shown in FIG. 3, biasing members 78 bias friction plate 38 in the direction of arrow 80, which in turn biases control bolt 34 and locking member 36 in the direction of arrow 80 such that locking member engagement portion 66 and block first edge 58 are separated. In alternate embodiments, biasing member 78 may directly bias locking member 36 in the direction of arrow 80 rather than indirectly via control bolt 34. For example, friction plate 38 may abut third sidewall 52 and a biasing member (not shown) of plate 38 (e.g., a leaf spring) may extend into contact with and provide a biasing force in the direction of arrow 80 to locking member 36 such as at engagement portion 66.

In operation, lever 26 may be rotated to a first position (not shown) where friction plate assembly 30 is loose or uncompressed to thereby unlock steering column assembly 10 and enable its adjustment (i.e., telescope and/or rake position movement). Lever 26 may then be rotated to a second position (FIG. 1) to modulate the cam (not shown) and shift control bolt 34 such that nut 42 applies a compressive force that brings thrust bearing 40, friction plate 38, locking member 36, and clamp block 32 into clamping or frictional engagement. This compressed or locked position of friction plate assembly 30 facilitates preventing control bolt 34 from translating along friction plate elongated aperture 64 to thereby facilitate preventing adjustment of steering column 12 in the direction of arrows 70, and may also dampen telescoping load.

Under normal operating conditions, for example as illustrated in FIG. 3, biasing members 78 press against clamp block second edge 62 and provide a biasing force to friction plate 38 and locking member 36 (via control bolt 34) in the direction of arrow 80. In this position, teeth 68 of locking member engagement portion 66 are kept out of engagement with teeth 60 of clamp block first edge 58.

Under abnormal operating conditions (e.g., a crash event), a force may act on steering column assembly 10 that overcomes the compressive forces provided by friction plate assembly 30, resulting in unwanted movement of steering column 12. For example, a driver impacting steering column 12 may force the column in a generally upward raking direction.

However, the exemplary friction plate assembly 30 described herein facilitates preventing these unwanted adjustments during such high load events. As shown in FIG. 4, when a predefined force 'F' acts through steering column assembly 10 on bolt 34, friction plate 38 is biased in the direction of arrow 82 and biasing members 78 compress against third sidewall 52. As friction plate 38 translates in the direction of arrow 82, control bolt 34 and locking member 36 are moved in the same direction. Locking member engagement portion 66 subsequently comes into engagement with clamp block first edge 58. The resulting engagement between teeth 60 and 68 facilitates preventing movement of control bolt 34 and steering column 12 in the direction of arrows 70 (FIG. 1); i.e., an upward or downward raking direction.

A method of assembling adjustable steering column assembly 10 includes providing steering column 12 and fixing mounting bracket 22 to the vehicle in an orientation disposed about steering column 12. Clamp block 32 is coupled to mounting bracket 22 and includes first edge 52 having teeth 60, and second edge 62. Control bolt 34 is inserted through locking member aperture 64, friction plate aperture 72 and thrust bearing 40, and nut 42 is subsequently secured to bolt first end 44. Locking member 36 is disposed within clamp block cavity 54 such that engagement portion 66 having teeth 68 is in proximity to second edge 62 for selective engagement therewith. Friction plate 38 is disposed in clamp block 32 and oriented such that biasing members 78 are positioned against clamp block second edge 62, thereby providing a biasing force through friction plate 38 to bolt 34 in the direction of arrow 80 to thereby separate engagement portion 66 and block first edge 58.

Described herein are systems and methods for controlling the adjusting movement of an assembly such as a steering column assembly. In exemplary embodiments of the invention, a friction plate assembly acts as a biasing mechanism to maintain clearance between opposing assembly components, yet facilitates engagement between those opposing components under a predetermined load to prevent unwanted movement of the steering column assembly. Additionally, the friction plate assembly resists or maintains separation of the components for normal operations if steering column assembly features break prematurely. The friction plate assembly may also act as a telescope abuse mechanism to dampen telescope impact loads, and may allow a clamp pressure release by enabling sliding of tapered clamp surfaces.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A friction plate assembly for a steering column adjustable in a tilt direction and a telescope direction, said friction plate assembly comprising:
   a clamp block;
   a locking member having a toothed portion;
   a bolt extending through said locking member; and
   a friction plate configured for selective frictional engagement with said locking member, said friction plate movable between an uncompressed first position where said friction plate does not frictionally engage said locking member to allow movement of said steering column in said tilt direction, and a second position where said friction plate is frictionally compressed against said locking member to compress said locking member against said clamp block and facilitate preventing movement of said steering column in said tilt direction,
   said friction plate receiving said bolt therethrough and including at least one biasing member configured to bias said bolt and said locking member in said telescope direction,
   wherein when a predetermined force acts on said at least one biasing member, said friction plate is configured to force said locking member toothed portion into engagement with said clamp block to facilitate preventing movement of said bolt in said tilt direction.

2. The assembly of claim 1, wherein said at least one biasing member comprises at least one spring finger.

3. The assembly of claim 2, wherein said at least one spring finger is stamped from said friction plate.

4. The assembly of claim 2, wherein said friction plate is disposed in a plane and said at least one spring finger extends from said plane.

5. The assembly of claim 1, further comprising a thrust bearing, said bolt extending through said thrust bearing such that said friction plate is disposed between said thrust bearing and said locking member.

6. An adjustable steering column assembly for a vehicle, said adjustable steering column assembly comprising:
   a steering column extending along a longitudinal axis and arranged for positional adjustment in a first direction;
   a mounting bracket fixed to the vehicle and disposed about said steering column;
   a steering column clamp block coupled to said mounting bracket, said steering column clamp block having a first edge and a second edge;
   a locking member having an engagement portion, said locking member disposed within said steering column clamp block such that said engagement portion is in proximity to said second edge for selective engagement therewith;
   a bolt extending through said steering column clamp block and said locking member; and
   a friction plate disposed within said steering column clamp block and configured for selective frictional engagement with said locking member,
   said friction plate having an elongated slot to receive said bolt therethrough such that said bolt and said locking member are translatable relative to said friction plate in the first direction, said friction plate including at least one biasing member engaging said first edge, said at least one biasing member configured to bias said bolt and said locking member in a second direction where said engagement portion does not engage said second edge,
   wherein when a predetermined force acts on said at least one biasing member, said friction plate forces said locking member engagement portion into engagement with said second edge.

7. The assembly of claim 6, wherein said at least one biasing member comprises at least one spring finger.

8. The assembly of claim 7, wherein said at least one spring finger is stamped from said friction plate.

9. The assembly of claim 7, wherein said friction plate is disposed in a plane and said at least one spring finger extends from said plane.

10. The assembly of claim 6, further comprising a thrust bearing, said bolt extending through said thrust bearing such that said friction plate is disposed between said thrust bearing and said locking member.

11. The assembly of claim 6, wherein said at least one biasing member comprises a first biasing member and a second biasing member.

12. The assembly of claim 6, wherein said engagement portion includes a first plurality of teeth and said second edge includes a second plurality of teeth, wherein said first plurality of teeth selectively engage said second plurality of teeth to facilitate preventing movement of said bolt in said first direction, and wherein said second edge and said second plurality of teeth extend along a direction substantially orthogonal to said steering column longitudinal axis.

13. The assembly of claim 6, further comprising a lever coupled to said bolt to facilitate positional adjustment of said steering column in said first direction.

14. The assembly of claim 6, wherein said friction plate further includes an elongated slot to receive said bolt.

15. The assembly of claim 6, wherein said engagement portion is arcuate.

16. The assembly of claim 6, wherein said second direction extends along said longitudinal axis toward an end of said steering column configured to couple to a steering wheel.

17. The assembly of claim 6, wherein said first direction is a tilt adjustment direction of said steering column.

18. A method of assembling an adjustable steering column for a vehicle, the method comprising:
   providing a steering column extending along a longitudinal axis and arranged for positional adjustment in a tilt direction;
   fixing a mounting bracket to the vehicle such that the mounting bracket is disposed about the steering column;
   coupling a steering column clamp block to the mounting bracket, the steering column clamp block having a first edge and a second edge;
   disposing a locking member having an engagement portion within the steering column clamp block such that the engagement portion is in proximity to the second edge for selective engagement therewith;
   inserting a bolt through the steering column clamp block and the locking member; and
   disposing a friction plate within the steering column clamp block, the friction plate receiving the bolt therethrough, the friction plate configured for frictional engagement with the locking member, the friction plate including at least one biasing member engaging the first edge, the at least one biasing member configured to bias the bolt and the locking member in a second direction substantially parallel to the steering column longitudinal axis such that the engagement portion does not engage the second edge.

19. The method of claim 18, wherein said disposing a locking member with an engagement portion comprises disposing a locking member with a toothed engagement portion.

20. The method of claim 19, wherein said coupling a steering column clamp block having a second edge comprises coupling a steering column clamp block having a toothed second edge.

* * * * *